(12) United States Patent
Witting et al.

(10) Patent No.: US 10,943,185 B1
(45) Date of Patent: Mar. 9, 2021

(54) SUPERVISED MACHINE-LEARNING TRAINING PLATFORM WITH ISOLATED UPDATE TESTING AND BI-DIRECTIONAL UPDATE PROPOGATION

(71) Applicant: Bank of America Corporation, Charlotte, NC (US)

(72) Inventors: David H. Witting, Puyallup, WA (US); Maruthi Z Shanmugam, Plano, TX (US); Jamaal C. Long, Plano, TX (US); Matthew Hsieh, Plano, TX (US); Luis Gerardo Mojica de la Vega, Plano, TX (US); Viju Kothuvatiparambil, Plano, TX (US); Mahalakshmi Chandra Sekaran, Seattle, WA (US); Donatus Asumu, Plano, TX (US); Karen Trevino, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 16/167,811

(22) Filed: Oct. 23, 2018

(51) Int. Cl.
*G06N 20/00* (2019.01)
*G06F 9/451* (2018.01)
*G06F 16/2457* (2019.01)

(52) U.S. Cl.
CPC ............. *G06N 20/00* (2019.01); *G06F 9/451* (2018.02); *G06F 16/24575* (2019.01)

(58) Field of Classification Search
CPC .... G06N 20/00; G06F 16/24575; G06F 9/451
See application file for complete search history.

(56) References Cited

U.S. PATENT DOCUMENTS

| | | | |
|---|---|---|---|
| 7,016,829 B2 | 3/2006 | Brill et al. | |
| 9,536,522 B1 | 1/2017 | Hall et al. | |
| 10,303,978 B1* | 5/2019 | Kang | G06N 3/088 |
| 2015/0378716 A1* | 12/2015 | Singh | H04W 4/60 717/172 |
| 2016/0162464 A1 | 6/2016 | Munro et al. | |
| 2017/0169813 A1 | 6/2017 | Suzuki et al. | |
| 2017/0256256 A1* | 9/2017 | Wang | G10L 15/26 |
| 2018/0247648 A1* | 8/2018 | Nadimpalli | G10L 15/22 |
| 2019/0166069 A1* | 5/2019 | Yao | G06F 3/0486 |

* cited by examiner

*Primary Examiner* — Tan H Tran
(74) *Attorney, Agent, or Firm* — Weiss & Arons LLP; Michael A. Springs, Esq.

(57) ABSTRACT

Aspects of the disclosure relate to supervised machine-learning ("ML") training platforms for artificial intelligence ("AI") computer systems. The ML training platform may include isolated update testing. The isolated update testing may feature a plurality of environments with various levels of isolation. The ML training platform may also include bi-directional channels for controlled update propagation.

16 Claims, 15 Drawing Sheets

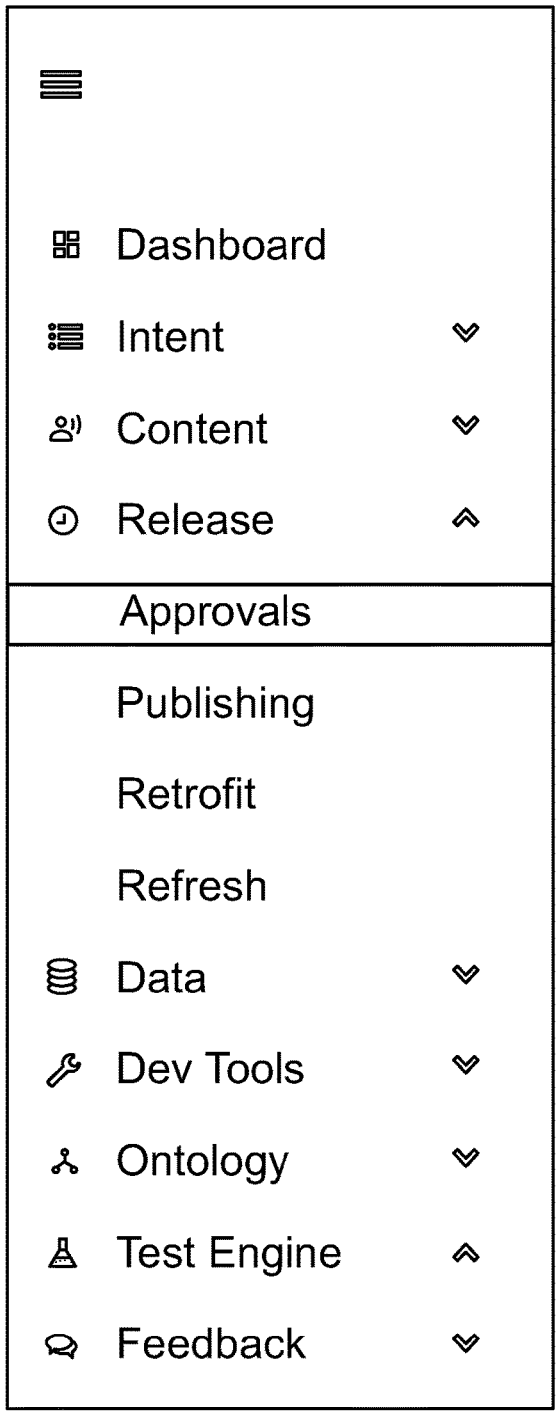
FIG. 4E
FIG. 4F

Conversation                                                                 Home/ Conversation RUN TEST                                                                         Start new conversation

| NAME | DESCRIPTION | USER RATING |
|---|---|---|
| Automobile Loan | Incorrect response | 👎 |
| Automobile Loan demo | Incorrect response demo | 👎 |
| Automobile Loan oculus | Incorrect response oculus | 👎 |
| Automobile Loan test | Incorrect response test | 👎 |
| Balance and help | Balance and help | 👍 |
| Balance check | balance | 👍 |
| Balance enquiry | Balance enquiry | 👎 |
| Balance enquiry oculus | Balance enquiry | 👍 |
| Check and help | balance check and contactus | 👍 |
| Checking Balance | Balance | 👎 |
| Connect Me | connect to agent | 👎 |
| ConvTest_041217 | Bad | 👎 |
| ConvTest_041217 | Bad | 👎 |
| ConvTest_041217_0635 | Bad | 👎 |
| ConvTest_051217_0635 | Bad | 👎 |

FIG. 6

Query Text: show my spending for the past six months
Predicted Intent: SI_SPEND_BUDGET_GENERAL

Corrected Query: show my spending for the past six months

Predicted ML Intents:

| Intent | Value |
|---|---|
| SI_SPEND_BUDGET_GENERAL | 0.9957933829043389 |
| SI_GET_CREDIT_SCORE_BY_HISTORY | 0.0027255611503061810.002725561150306181 |
| FAQ_TRANSFER_SCHEDULED_FUTURE | 0.0004821185259831704 |
| SI_GET_LAST_MONTH_CREDIT_SCORE_DIFFERENCE | 0.0002505040971318580.000250504097131858 |
| SI_PAST_APPOINTMENT | 0.0002249619362905752 |

Concepts Extracted: SpendingTopic, Date

FIG. 7

Approvals

Home/ Approvals

Search  
Limit  
10 ▽

| USER NAME | TIMESTAMP | CHANGE TYPE | BUSINESS APPROVAL | TECH APPROVAL |
|---|---|---|---|---|
| User x | 03/18/2018 3:45 AM | CONTENT:MBDA:testkaizen.00 | Pending Approval | Approve \| Reject |
| User x | 03/18/2018 3:45 AM | CONTENT:MOBILEAPP:test | Pending Approval | Approve \| Reject |
| User x | 03/18/2018 3:45 AM | CONTENT:MOBILEAPP | Pending Approval | Approve \| Reject |
| User y | 03/18/2018 3:45 AM | CONTENT:MBDA:testgt007 | Pending Approval | Approve \| Reject |
| User y | 03/18/2018 3:45 AM | CONTENT:MOBILEAPP:test | Pending Approval | Approve \| Reject |
| User y | 03/18/2018 3:45 AM | CONTENT:MOBILEAPP: | Pending Approval | Approve \| Reject |
| User z | 03/18/2018 3:45 AM | CONTENT:MBDA:testgt006 | Pending Approval | Approve \| Reject |

FIG. 9

Version
Draft - 03/23/2018 2:15 PM ▽    COMPARE

Status            Edit Date
Submitted             03/23/2018 2:15 PM

⊞ Added Utterances
31 Utterances added

1. Hi pay my {MetroPCS:ToAccount} phone
2. I need to do a Zelle transfer
3. Zelle transfer
4. I want transfer using zelle
5. zelle someone money
6. Can you do a transfer for me
7. Can we make a transfer to my {credit card:ToAccount}
8. Can you make a transfer for me
9. send {$1:Money} to {John Doe mobile:ToAccount}
10. send {andrew:ToAccount} {$10:Money}
11. i want to pay a bill
12. Make a payment on my {Nordstrom account:ToAccount}
13. Transfer {$39.29:Money} to {Gippy:ToAccount}
14. Transfer {$5:Money} to {bella:ToAccount} account
15. zelle {$5:Money} to {john:ToAccount}
16. make a payment to {Best buy:ToAccount}
17. send $50 to brad
18. Make a payment to my card that ends in 4534
19. Transfer $100 to Karuna account
20. payoff {loan:ToAccount}
21. payoff {mortgage:ToAccount}
22. payoff my account
23. I want to payoff my {loan:ToAccount}

FIG. 11

SUPERVISED MACHINE-LEARNING TRAINING PLATFORM WITH ISOLATED UPDATE TESTING AND BI-DIRECTIONAL UPDATE PROPOGATION

FIELD OF TECHNOLOGY

Aspects of the disclosure relate to intelligent computer systems. Specifically, aspects of the disclosure relate to machine-learning training platforms for computerized conversational assistants.

BACKGROUND OF THE DISCLOSURE

Computerized systems with artificial intelligence ("AI") may execute every-day tasks with great effectiveness. An example of an AI system may be an intelligent conversational assistant that is able to derive the intent of an utterance spoken by a person.

The conversational assistant may be employed by an entity in a customer-facing role. The role may substitute for a customer-service representative. The conversational assistant may be tasked with understanding—i.e., deriving the intent of—, addressing, and/or responding to a customer query.

The success, or failure, of the interaction with the conversational assistant may impact customer satisfaction. The success of the interaction may be directly linked to the accuracy of the AI system. The accuracy, in turn, may depend, in large part, on a robust machine-learning ("ML") training platform.

It would be desirable, therefore, to provide an ML training platform. An ML training platform may include a learning algorithm that "learns" from training data. The breadth, thoroughness, and accuracy of the training data may affect the accuracy of an AI system. Thus, it would be further desirable to provide an ML training platform that tracks and controls updates to the training data.

A particular challenge faced by ML training platforms is maintaining consistency throughout the training process. For example, an update may be incorporated into a particular version of a system. The update may be absent from a training environment associated with a different version of the system. This may contribute to errors being introduced in the training environment because the training environment is not up to date. Therefore, it is an object of the embodiments to provide an ML training platform that maintains a level of consistency throughout the training process.

SUMMARY OF THE DISCLOSURE

Aspects of the disclosure relate to an artificial intelligence ("AI") system with controlled testing and propagation of updates. The system may include a computation module. The computation module may be configured to compute an intent of an utterance. The computation may be based at least in part on data that is stored in a data repository. The data may include a set of utterances, a set of intents, and a mapping between the set of utterances and the set of intents.

The system may also include a user interface ("UI") module. The UI module may be configured to receive input. The input may include training data entered by an authorized user. The UI module may also be configured to display output.

The system may also include a training subsystem. The training subsystem may be configured to receive a training input via the UI module. The training subsystem may apply the training input to a select environment from a plurality of environments. Each of the plurality of environments may be configured with a predetermined level of isolation from a published version of the system.

The training subsystem may be configured to determine an effect of the training input on an accuracy of the computation module. The training subsystem may also be configured to output the effect via the UI module.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 4A-4J show illustrative screenshots in accordance with principles of the disclosure;

FIG. 6 shows another illustrative display in accordance with principles of the disclosure;

FIG. 7 shows yet another illustrative display in accordance with principles of the disclosure;

FIG. 9 shows another illustrative display in accordance with principles of the disclosure;

FIG. 11 shows still another illustrative display in accordance with principles of the disclosure.

DETAILED DESCRIPTION OF THE DISCLOSURE

Figure 1:
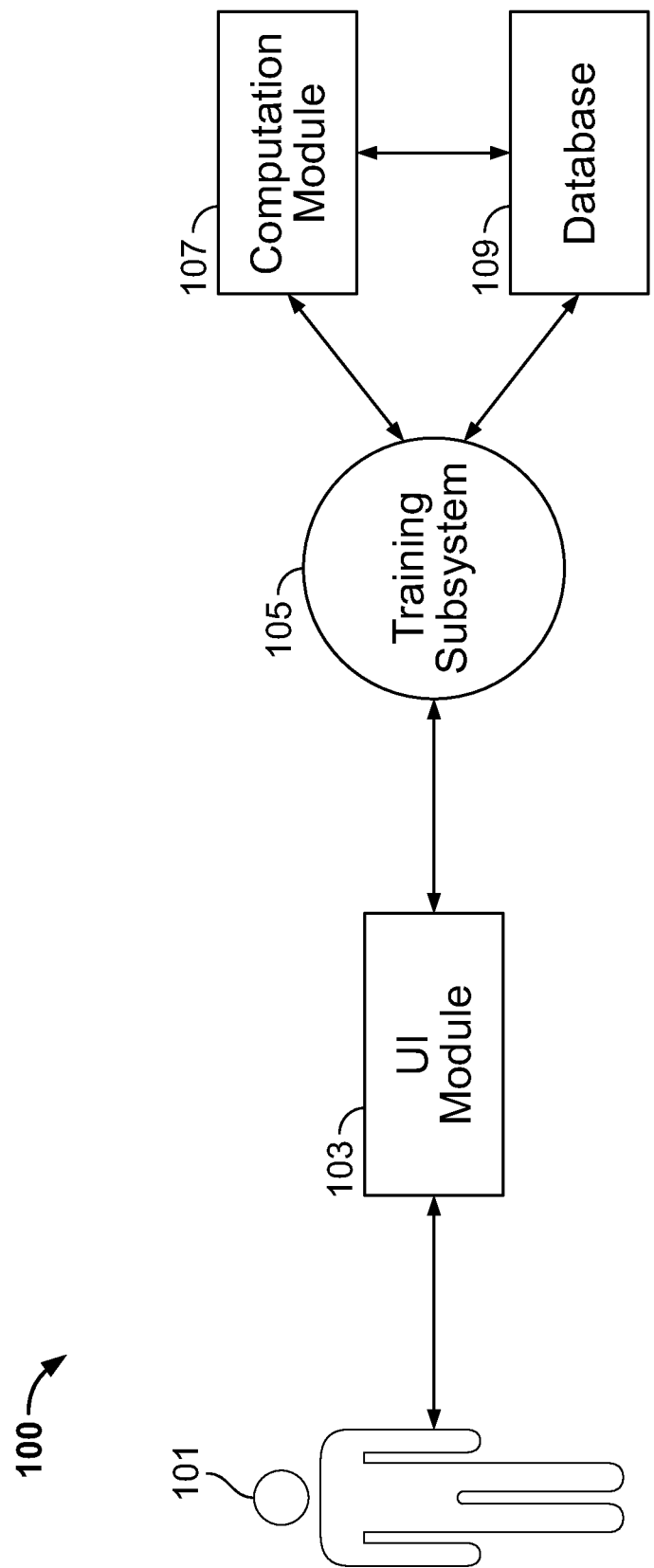
FIG. 1 shows an illustrative system in accordance with principles of the disclosure.

Systems and methods disclosed herein may enable a variety of users to provide supervised training to an artificial intelligence ("AI") computerized system. The AI computerized system may be any suitable AI system. In some embodiments, the AI computerized system may be an intelligent conversational assistant. An intelligent conversational assistant may be designed to derive, or compute, the intent of an utterance. An utterance may be a word or combination of words. The intent of an utterance may be the intended meaning underlying the utterance.

The training may include updating the training data. Updating the training data may involve addition, modification and/or removal of exemplary utterances and semantic relationships. The training may be executed through a platform that provides continuous feedback for the supervised learning process.

One type of user providing the training may be a business domain subject matter expert. The business expert may be familiar with the lexicon, syntax and grammatical constructs used to express ideas in a specific industry vertical such as the financial domain. Another type of user may be technically skilled in understanding the impact to the system of the addition, modification, or removal of supervised training utterances. Yet another type of user may be skilled in the construction of semantic relationships present in the lexicon of the domain, and can use the system to visualize and construct such relationships. Other types of users, such as developers creating additional features for the platform, may leverage the exposed application programming interface ("API") to introduce new capabilities to the platform.

All users of the system may be supported by the capability of the system to provide feedback on supervised training actions. A training action may be taken to enhance or review the current state of supervised learning. The system may provide immediate feedback regarding the impact of any changes made by the user to the effectiveness of the conversational assistant. The system may be further constructed in such a manner as to facilitate a rapid extension of its capabilities through an API that permits agile introduction of additional software components. The additional software components may handle additional requirements. The additional requirements may support current supervised learning, and/or future unsupervised learning.

Aspects of the disclosure relate to an AI system with controlled testing and propagation of updates. The system may include a computation module. The computation module may be configured to compute an intent of an utterance. The computation module may include suitable computer hardware running suitable computer software. The computer software may include a "learning" algorithm. The computation may be based at least in part on data that is stored in a data repository. The data may include a set of utterances, a set of intents, and a mapping between the set of utterances and the set of intents.

The system may also include a user interface ("UP") module. The UI module may be configured to receive input and display output. The UI module may include an input/output ("I/O") component. The IO component may include a keyboard, a display screen, a touchscreen, a microphone, a speakerphone, and/or any other suitable component for input or output.

The system may also include a training subsystem. The training subsystem may be configured to receive a training input via the UI module. In some embodiments, the training input may include a second mapping between one or more utterances and one or more intents. The second mapping may either add to, remove from, or modify the mapping included in the data.

The training input may be entered by a user. The user may be an expert. Examples of expert users include business experts, language experts, and system experts.

The expert may enter a training input to improve the comprehension level of the computation module. The comprehension level may include an accuracy with which the computation module computes the intent of an utterance. The accuracy may be an overall accuracy, such as an average accuracy over many utterances. Alternatively, the accuracy may be specific to a certain utterance or set of utterances. The system may provide the expert with the ability to view, add, modify, remove, and/or assess the impact of an update (i.e., application of a training input) on the comprehension level of the computation module.

The training subsystem may be configured to determine an effect of the training input on an accuracy of the computation module. The effect may include an increase, decrease, or maintenance of the accuracy. The effect may also include specific measurements of the increase or decrease, such as a percentage or a raw number. The training subsystem may also be configured to output the effect via the UI module.

In certain embodiments, the system may include a versioning module. The versioning module may be configured to maintain a plurality of environments. Each environment may be configured with a level of isolation from a published version of the computation module. When determining the effect of the training input on an accuracy of the computation module, the training subsystem may be further configured to apply the training input to a select environment from the plurality of environments. In some embodiments, a user may select the environment for a training session via the UI module. For example, the user may be presented, via the UI module, with a selectable menu of available environments. Alternatively, the user may search for, or otherwise request, a desired environment. In yet another example, a user may be directed to a default, or otherwise pre-selected, environment. The user may or may not be restricted to the pre-selected environment.

The plurality of environments may include a k number of environments. The k number of environments may be labeled $E_1$-$E_k$. $E_1$ may be configured with a maximum level of isolation from a published version of the computation module. A maximum level of isolation may mean that the application of a training input to $E_1$ is not incorporated into the published version of the computation module. $E_k$, on the other hand, may be configured with a minimum level of isolation. A minimum level of isolation may mean that the application of a training input to $E_k$ includes full incorporation into a published version of the computation module.

In some embodiments of the system, $E_1$ may be a private drafting environment. $E_1$ may be accessible only to a single authorized user. Furthermore, the environments between $E_1$ and $E_k$ may be configured with successively decreasing levels of isolation. Some or all of the environments between $E_1$ and $E_k$ may be staging environments. The staging environments may be configured for development, integration, and/or quality assurance of training inputs.

An aspect of the versioning module may include maintaining different versions for different versions of a mobile application ("app"). For example, if a customer has not downloaded the latest version of an app associated with a published version of the computation module, the system should preferably direct appropriate output from the computation module in response to a query of the customer. The appropriate output may be dependent on the version of the app that the customer is using.

In some embodiments, the system may include bi-directional channels between the plurality of environments. The bi-directional channels may be configured to propagate a training input in a forward direction and also in a backward direction. The forward direction may be from $E_1$ toward $E_k$. The backward direction may be from $E_k$ toward $E_1$.

A forward propagation of a training input may, in some embodiments, be contingent upon an approval. An approval may be issued by an authorized approver. An environment may be associated with a predetermined approver. For example, propagating a training input from $E_2$ to $E_3$ may be contingent upon the approval of an authorized engineering or technology approver. Propagating a training input to other environments may be contingent upon the approval of business or quality assurance approvers. In some embodiments, propagating a training input to other environments may be contingent upon the approval of multiple approvers.

In certain embodiments of the system, the training subsystem may be further configured to display, via the UI module, a variety of information. The variety of information may include the data of the database. The variety of information may also include an assessment of a level of performance of the computation module.

The variety of information may also include content, such as an output of the computation module. The output of the computation module may be linked to the computed intent. However, the system may contain a set of appropriate content to output for each intent. A dedicated module may act as a "conversation manager" to select the content to output for a computed intent. Such output may include graphical ("on the glass") and/or audio output. In some embodiments, the graphical output and the audio output may be different.

The output of the computation module may also include an action. An action may transfer a customer to an appropriate department or webpage. An action may be any suitable action in response to a customer query, such as closing an account or transferring a balance.

The information displayed by the training subsystem may also include user feedback to certain content. The user providing feedback may be a developer or an end user who is using a published version of the computation module. The information may also include recent changes to a particular environment, and/or recent changes to the system as a whole. The information may also include training inputs that are pending approval.

The system may also include, in some embodiments, an update maintenance module. The update maintenance module may be configured to track some or all of the updates to the system. The tracking may include the use of flags. The tracking may include a historical database of all the updates. An update may include the application or incorporation of a training input to a particular environment or a published version of the computation module.

The update maintenance module may track updates that involve adding, modifying, and removing an utterance/intent mapping. Tracking the removal of a mapping may be especially important to ensure that the mapping remains removed. Otherwise, at a later time the system may attempt to reintroduce the mapping without realizing that it was purposefully removed.

In some embodiments of the system, the training subsystem may trigger alerts. An alert may be triggered in response to a training input that may be detrimental to the system. A training input that may cause at least a threshold level of decay—i.e., reduction—in an accuracy of the computation module may be deemed detrimental to the system. A training input that may cause a collision with the mapping included in the data may also be deemed detrimental to the system. The mapping included in the data may be a mapping between a set of utterances and a set of intents. A collision may occur when a training input includes a mapping that is different from, or contradicts, the mapping included in the data.

The UI module, in certain embodiments, may include a testing simulator. The testing simulator may be accessible on a mobile device.

Some embodiments of the disclosure provide a method for machine-learning training. The method may include controlled testing and propagation of updates.

The method may include receiving a training input via a user interface ("UI") module. The method may also include applying the training input to a select environment from a plurality of environments. Each environment may be configured with a predetermined level of isolation.

The method may further include determining, within the select environment, an impact of the training input. The impact may be an impact on an accuracy of a computation module of an AI system.

The computation module may be configured to compute an intent of an utterance. The computation may be based at least in part on data that is stored in a data repository. The data may include a set of utterances, a set of intents, and a mapping between the set of utterances and the set of intents.

The method may also include displaying the impact via the UI module.

In certain embodiments of the method, the plurality of environments may include a k number of environments labeled $E_1$-$E_k$. $E_1$ may be configured with a maximum level of isolation, and $E_k$ may be configured with a minimum level of isolation. The environments between $E_1$ and $E_k$ may be configured with successively decreasing levels of isolation. In these embodiments of the method, applying a training input to $E_1$ may be independent of incorporation into a published version of the computation module. Furthermore, applying a training input to $E_k$ may include full incorporation into a published version of the computation module.

In some embodiments of the method, $E_1$ may be a private drafting environment. A private drafting environment may be accessible only to a single authorized user.

In certain embodiments of the method, each of $E_1$-$E_k$ may be an environment that is configured for developing, integrating, and assuring a quality of training inputs.

In some embodiments, the method may include propagating the training input in a forward direction. A forward direction may be from $E_1$ toward $E_k$. The method may also include propagating the training input in a backward direction. A backward direction may be from $E_k$ toward $E_1$.

Propagating the training input in a forward direction, may, in certain embodiments, be contingent upon an approval of an authorized approver.

A training input may include new training data. The new training data may be a new mapping between one or more utterances and one or more intents. The new mapping may add to the mapping included in the data of the database. The new mapping may be a removal from the mapping included in the data of the database. The new mapping may also be a modification of the mapping included in the data of the database.

In certain embodiments, the method may include displaying various information via the UI module. The information may include the data included in the database. The information may include an assessment of a performance of the computation module. The information may also include content of the system. The content may include an output of the computation module.

The method may include tracking, via an update maintenance module, some or all of the updates to the system. The updates may be applied to each of the plurality of environments. The updates may also be applied to each of a plurality of published versions of the computation module. Each update may include a training input.

Some embodiments of the method may further include triggering an alert. The alert may be triggered in response to a training input that may cause at least a threshold level of decay in an accuracy of the computation module. The alert may also be triggered in response to a training input that may cause a collision with the mapping included in the data.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows diagram 100 of a system in accordance with principles of the disclosure. The system may be an AI system such as an intelligent conversational assistant. An intelligent conversational assistant may be designed to compute, among other things, the intent of an utterance, even if the system has not yet encountered that precise utterance. The intelligence of the system may be the computation module 107. Computational module 107 may use hardware and/or software to "learn" from training data stored in database 109, and, when encountering a new utterance, compute the appropriate intent. Database 109 may or may not be included in computation module 107. The system shown in diagram 100 may also provide functionality for safe and controlled training of the system.

User 101 may be an expert that interacts with the system. User 101 may interact with the system to provide training inputs to the system and receive feedback from the system.

User interface ("UI") module 103 may receive input from, and display output to, user 101. The input may include the selection of various options for navigating and/or manipulating the system. The input may also include a training input, such as data in the form of an utterance, an intent, and a mapping between the utterance and the intent. User 101 may enter the input to improve the performance of the system. Improving the performance may include improving the accuracy with which computation module 107 computes the intent of one or more utterances.

The output may include information that may be helpful to the training process. The information may include an effect on the performance of the system. The information may also include data stored in database 109, as well as updates and status indicators for various components of the system.

Input received by UI module 103 may be utilized by training subsystem 105. Training subsystem 105 may include hardware and/or software to ascertain the effects that a training input has on the system. The effect on the system may include an increase, decrease, or maintenance of the performance of computation module 107.

Training subsystem 105 may accomplish the ascertaining in one of many environments (not shown). The environments may be designed with a level of isolation. For example, a highly isolated environment may act as a sandbox to provide testing of an update—e.g., a training input—without danger to the health of the general system. Furthermore, propagating an update from one environment to the next may expose the update to a larger pool of people, thus representing a decrease in the isolation of the environment. Propagating the update may be contingent upon an authorized approval.

Figure 2:
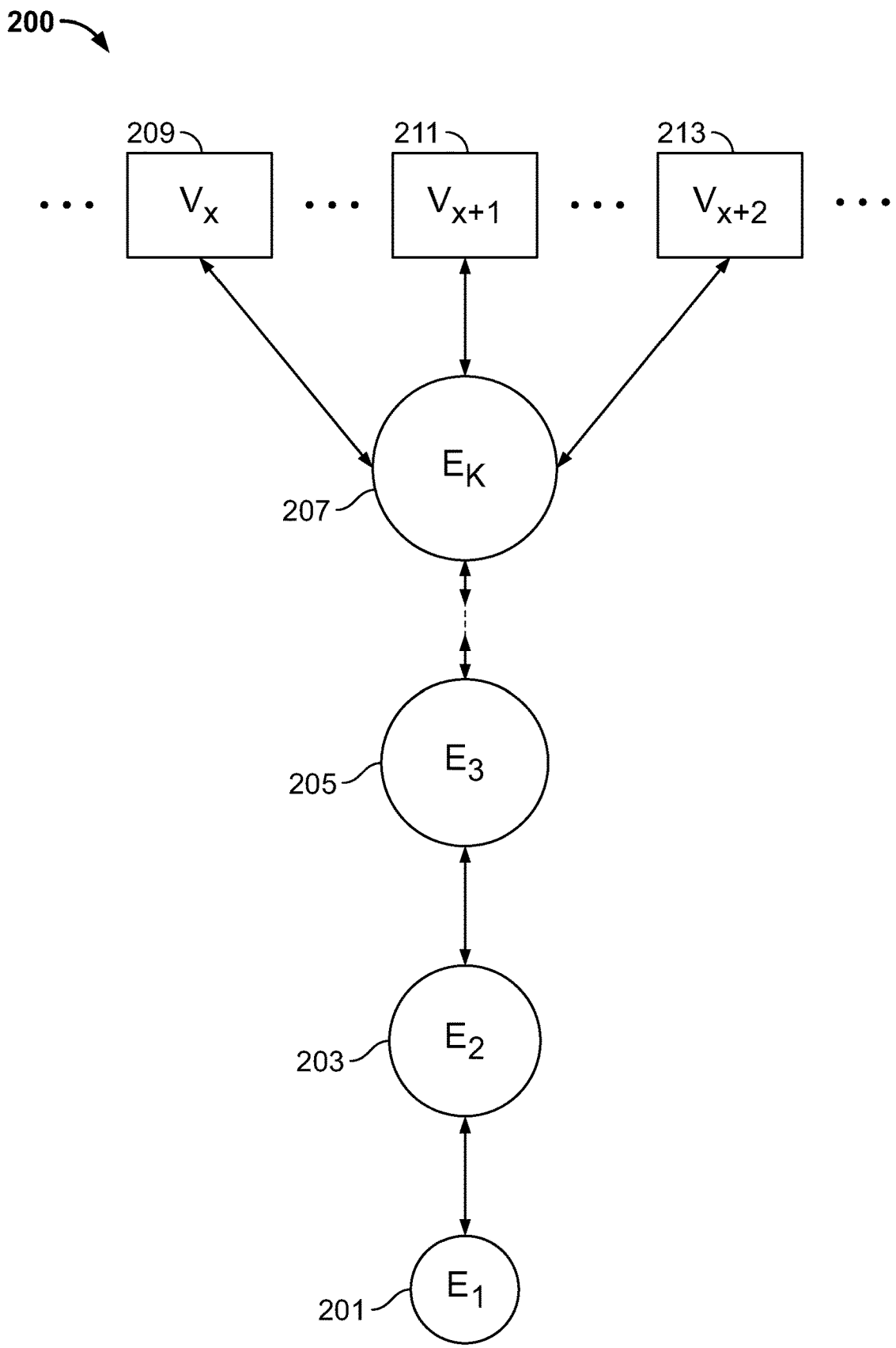
FIG. 2 shows another illustrative system in accordance with principles of the disclosure.

FIG. 2 shows diagram 200 of a system in accordance with principles of the disclosure. Diagram 200 shows a plurality of training environments 201-207. Training environments 201-207 may represent a development pipeline. Diagram 200 also shows a plurality of published versions 209-213. The development pipeline may feed into one or more of the published versions.

Environment 201 may be the most isolated environment, $E_1$. $E_1$ may be a drafting environment. The drafting environment may be accessible exclusively to a single user. In other embodiments, a drafting environment may be accessible to a group of users. A group of users may be a development team, or any other suitable group. $E_1$ may also, or alternatively, be a staging environment.

Training subsystem 105 (see FIG. 1) may apply a training input to environment 201. Applying a training input to environment 201 may provide an isolated testing environment for the training input. For example, the training subsystem may run the computation module (107 in FIG. 1), or a copy of the computation module, on a new database that is updated with the training input. The new database may be separate from the database (109 in FIG. 1) used in a published version out in production. In some embodiments, the new database may be a copy of the published database (109 in FIG. 1). In other embodiments, the new database may be a virtual database that actually uses the published database (109 in FIG. 1), but with the changes from the training input.

Once a training input has been successfully tested in environment 201, the pipeline continues with environment 203. Environment 203 may be less isolated than environment 201. Environment 203 may be accessible to more users. Environment 203 may be closer to a published version of the system. Propagation of the training input from environment 201 to environment 203 may be contingent upon an authorized approval.

Propagation of the training input further up the pipeline—i.e., from environment 203 to environment 205, etc.—may include further authorized approvals. The successive environments may decrease in isolation. The decrease in isolation may include accessibility to more users. Decreased isolation may also mean being closer to a published version of the system.

The development pipeline may culminate with environment 207, $E_k$. Environment 207 may feed into a published version of the system. Published versions 209-213 may represent a chain of successive releases of the system. For example, version 209, $V_x$, may represent a June release. Version 211, $V_{X+1}$, may represent a July release, and Version 213, $V_{x+2}$, may represent an August release.

In some embodiments, the pipeline may feed into a pre-determined published version. There may be several pipelines. There may be one pipeline for each published version. In other embodiments, the pipeline may feed into more than one, or any, published version.

The arrows connecting environments 201-207 may represent channels for propagating updates. Some embodiments of the system may include bi-directional channels, as represented by the double-sided arrows. A bi-directional channel may provide forward update propagation (toward a published version) as well as backward update propagation (away from a published version). Backward update propagation may be used to retrofit an update that was incorporated into a published version of the system back into an isolated training environment. This may be desired to ensure that further training activities are consistent with the latest version of the system. Training activities that are not consistent with the latest version of the system may introduce errors, and may be detrimental to the performance and accuracy of the system.

For example, an update may be incorporated into version 209, which may be a June release. In parallel, a user may be working on a development pipeline, including environment 201, toward version 213, which may be an August release. A bi-directional pipeline may enable the system to backfill the update from the June release to an isolated training environment, such as environment 201, that is part of the pipeline of development for the August release.

It may be advantageous to track updates in an AI system. It may be particularly advantageous in a system with bi-directional channels that has the ability to propagate updates forward and backward. To illustrate with the example of the previous paragraph, the system may determine that environment 201 of an August pipeline is missing an update from a June release. The system may backfill the update to environment 201. However, in reality, a user in environment 201 may have previously seen the update and deleted it, or replaced it with a more optimal update. Thus, backfilling the update from the June release may be detrimental. To mitigate this problem, the system may provide an update maintenance module. The update maintenance module may track updates to the system. For example, in the above scenario, the update maintenance module may track that a user deleted the update. The tracking may utilize a flag. Therefore, the update maintenance module may prevent the system from retrofitting the update to the August development pipeline. Preventing the update may include the system not allowing the update. Preventing the update may include generating an alert that the update was previously removed.

Figure 3:
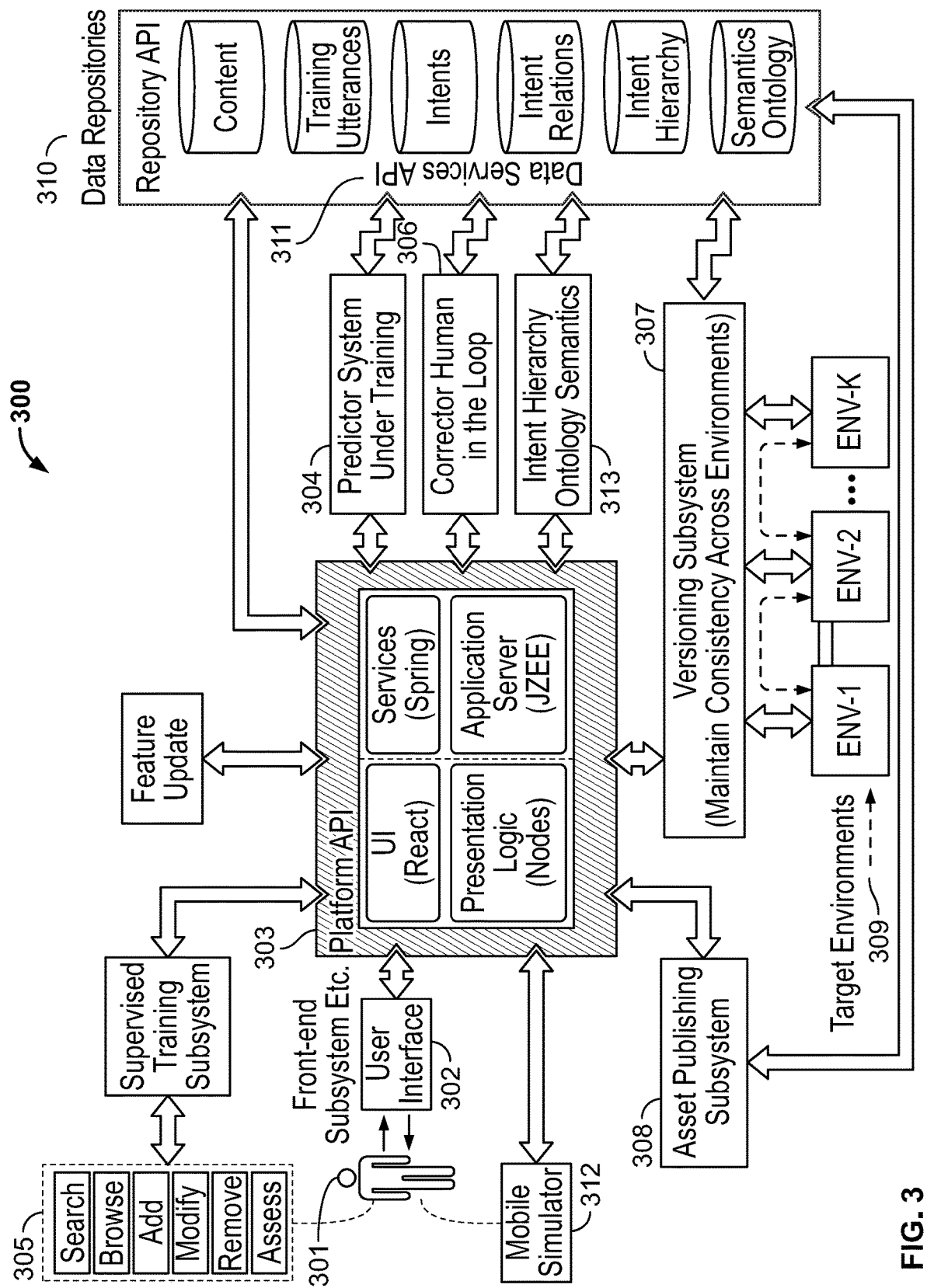
FIG. 3 shows an illustrative flowchart in accordance with principles of the disclosure.

FIG. 3 shows diagram 300 of a system in accordance with principles of the disclosure. In diagram 300, a user 301 may interact with a platform 303 through a user-interface (UI) front-end subsystem 302. Platform 303 may be a machine-learning training platform for an intelligent conversational assistant. Platform 303 may include software coded in a suitable programming language or languages. Suitable programming languages may include React, Node.js, Spring, J2EE, and/or NoSQL. NoSQL may include a Cassandra model. Platform 303 may utilize some or all of the above languages, or any other suitable programming language, for specific uses. For example, user interface may use React, presentation logic may use Node.js, services may use Spring, application server may use J2EE, and data may use NoSQL. Various AI capabilities may be provided by suitable AI algorithms, processes, modules, and/or languages. In some embodiments, platform 303 may include two servers. One server may provide front-end interactions and the second server may manage the back-end. Alternatively, the system may include any suitable number of servers.

User 301 may interface with platform 303 in order to achieve an increase in the scope and/or performance of interactions handled by a predictor subsystem 304. The increase may be achieved without a negative impact to the accuracy of existing interactions provided by predictor 304. Predictor 304 may be alternatively described herein as a computation module. Platform 303 may allow user 301 (via UI 302) to view, add, modify, remove, and assess (305) the impact of changes made to the comprehension level of predictor 304. From an assessment of the impact of changes made to the comprehension level, the user may be able to carry out corrective actions. Corrective actions may include modification, removal, or addition of further training utterance exemplars using the corrector subsystem 306.

User 301 may also be able to select a target environment to make the changes without any material impact on live production environments. This may be achieved by controlling the environment and the scope of changes through versioning 307 and publishing 308 subsystems. The target environments 309 for versioning and publishing may represent Development, Integration and/or Quality Assurance (QA) systems. Environments 309 may enable the impact of changes to be assessed before such changes are migrated to a runtime production environment.

The management and migration of supervised training assets across environments may be controlled through an asset versioning subsystem 307. Asset versioning subsystem 307 may maintain consistency across the data repositories 310 within each environment. Access for read and write to the data repositories may be provided through a data services application programming protocol (API) 311.

To support the assessment of the impact of training in a mobile environment, the training platform may use a mobile simulator 312. Mobile simulator 312 may be used to interact and record conversational sessions. Furthermore, a semantics relationship and ontology definition subsystem 313 may support the creation of additional constructs that can be used to enhance the supervised training process.

FIGS. 4A-4J show exemplary screenshots of a system in accordance with principles of the disclosure. The screenshots may represent information displayed by a training subsystem via a UI module.

Figure 4A:
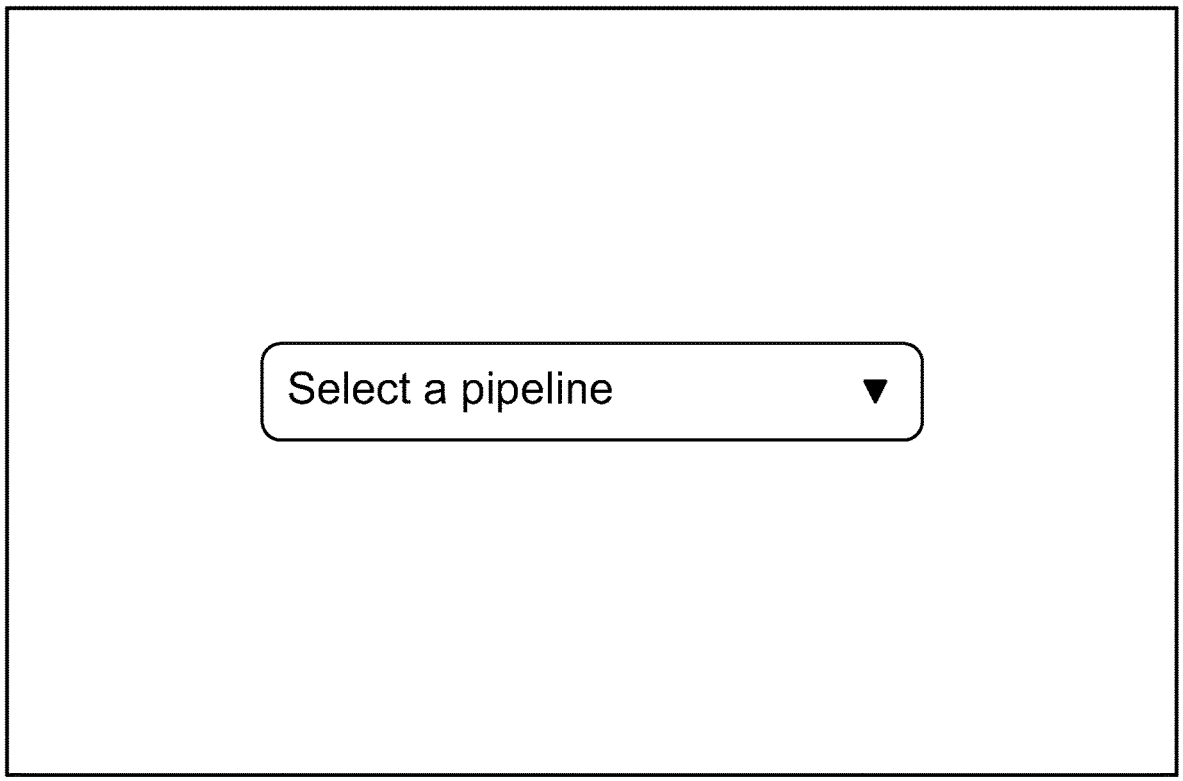
Figure 4B:
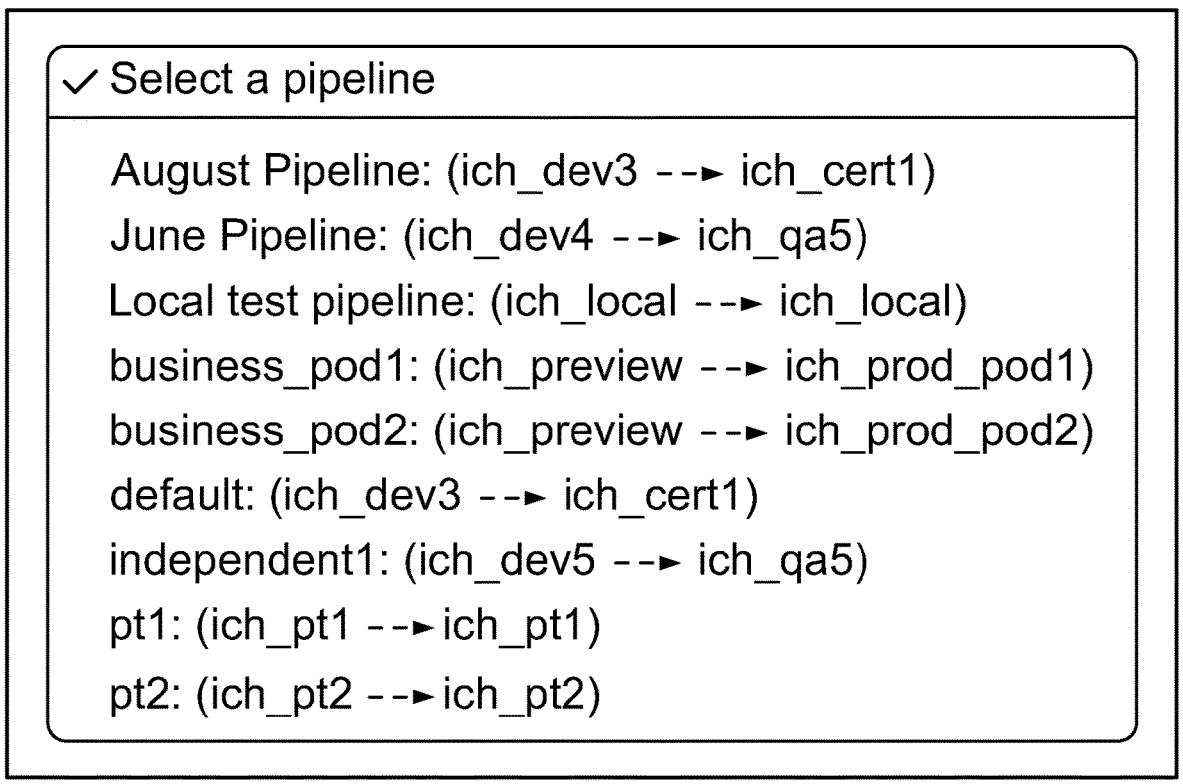

FIG. 4A may show a screen for selecting a training environment. The screen may include a drop-down menu. The menu may display the text "Select a pipeline." FIG. 4B may show the drop-down menu of FIG. 4A after the menu has been selected. The menu in FIG. 4B may now display one or more selectable environments.

FIGS. 4C-4J may show a navigation bar. The navigation bar may be a dashboard to provide a user the ability to navigate the training subsystem. Navigating the training subsystem may allow the user to view, add, modify, remove, and/or assess data and updates.

The navigation bar may include selectable buttons. Selecting a button may expand the navigation bar to display addition buttons. The additional buttons may represent subcategories beneath the parent category represented by the selected button. Parent categories may include: Intent, Content, Release, Data, Dev Tools, Ontology, Test Engine, and Feedback.

Figure 4C:
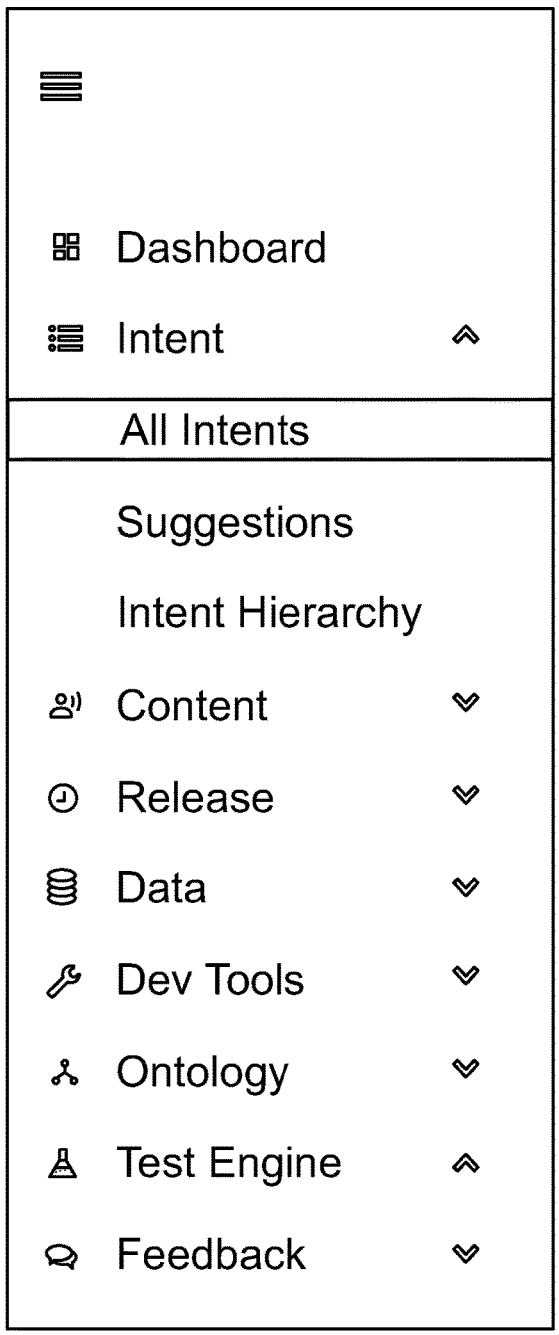

FIG. 4C may show a navigation bar with a button selected. The selected button may be for an "Intent" category. The selection may expand the navigation bar to additionally display the following subcategories: "All Intents," "Suggestions," and "Intent Hierarchy."

Figure 4D:
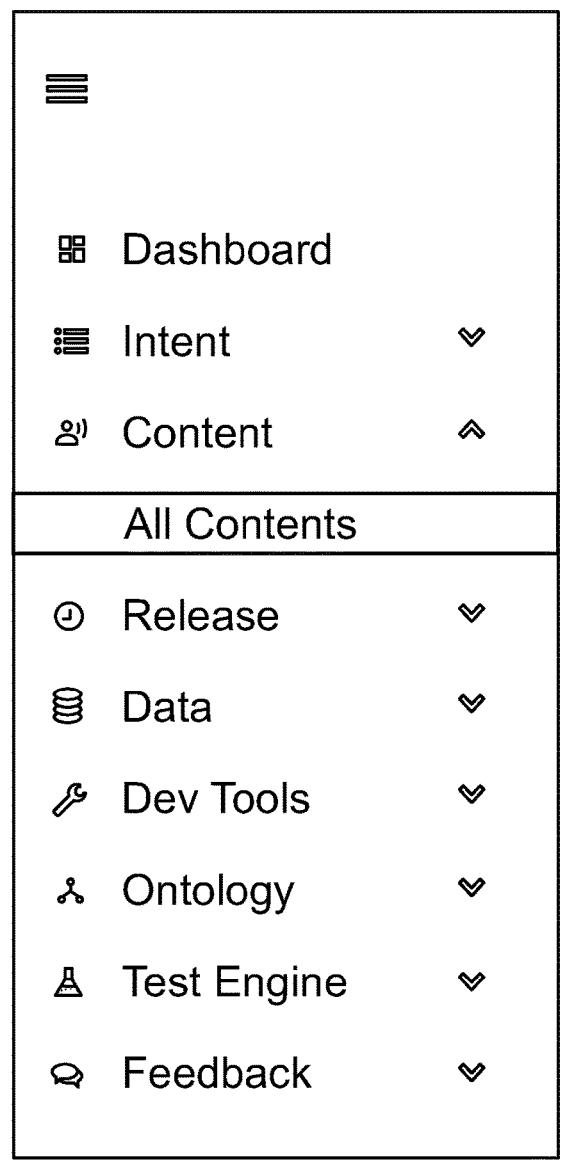

FIG. 4D may show a navigation bar with a button selected. The selected button may be for a "Content" category. The selection may expand the navigation bar to additionally display the subcategory "All Contents."

FIG. 4E may show a navigation bar with a button selected. The selected button may be for a "Release" category. The selection may expand the navigation bar to additionally display the following subcategories: "Approvals," "Publishing," "Retrofit," and "Refresh."

FIG. 4F may show a navigation bar with a button selected. The selected button may be for a "Data" category. The selection may expand the navigation bar to additionally display the subcategory "Tables."

Figure 4G:
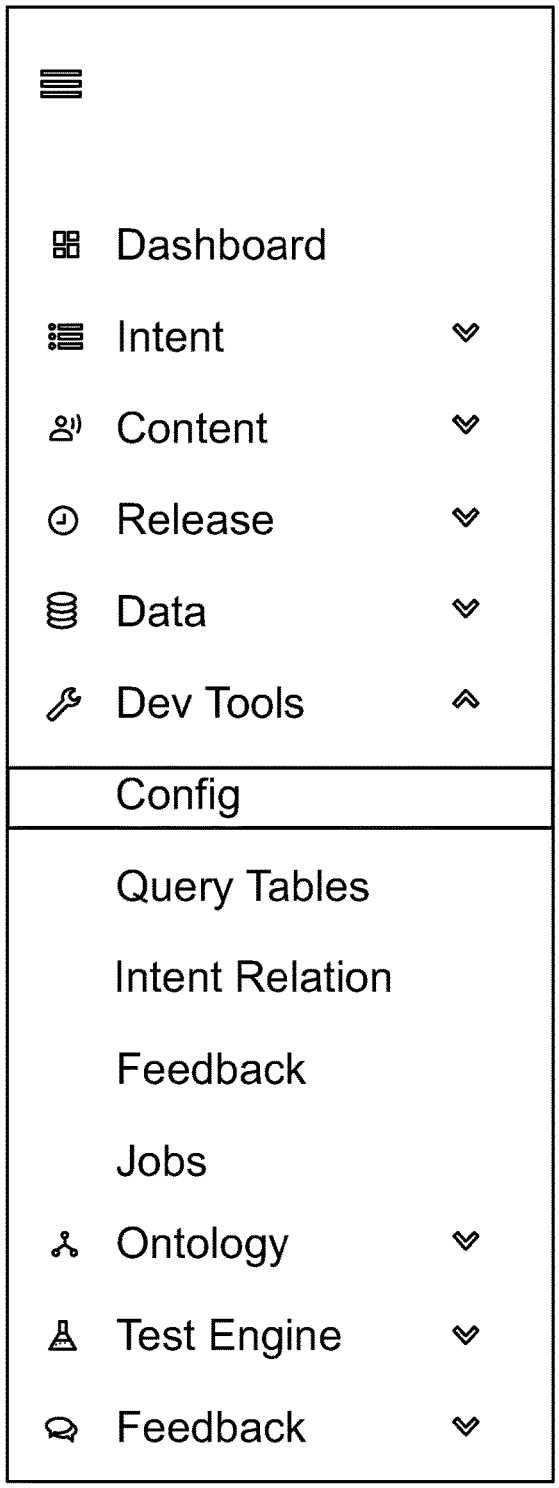

FIG. 4G may show a navigation bar with a button selected. The selected button may be for a "Dev Tools" category. The selection may expand the navigation bar to additionally display the following subcategories: "Config," "Query Tables," "Intent Relation," "Feedback," and "Jobs."

Figure 4H:
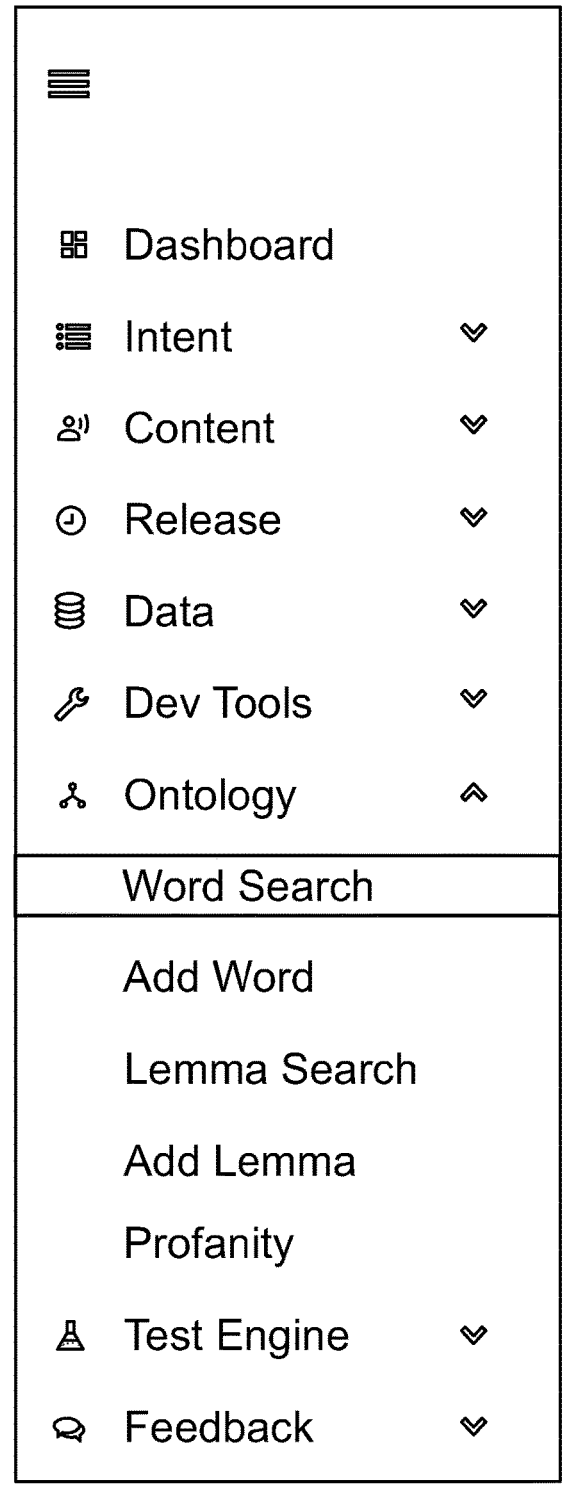

FIG. 4H may show a navigation bar with a button selected. The selected button may be for an "Ontology" category. The selection may expand the navigation bar to additionally display the following subcategories: "Word Search," "Add Word," "Lemma Search," "Add Lemma," and "Profanity." Ontology may refer to utterance/intent relationships in the context of a particular subject matter field or domain.

Figure 4I:
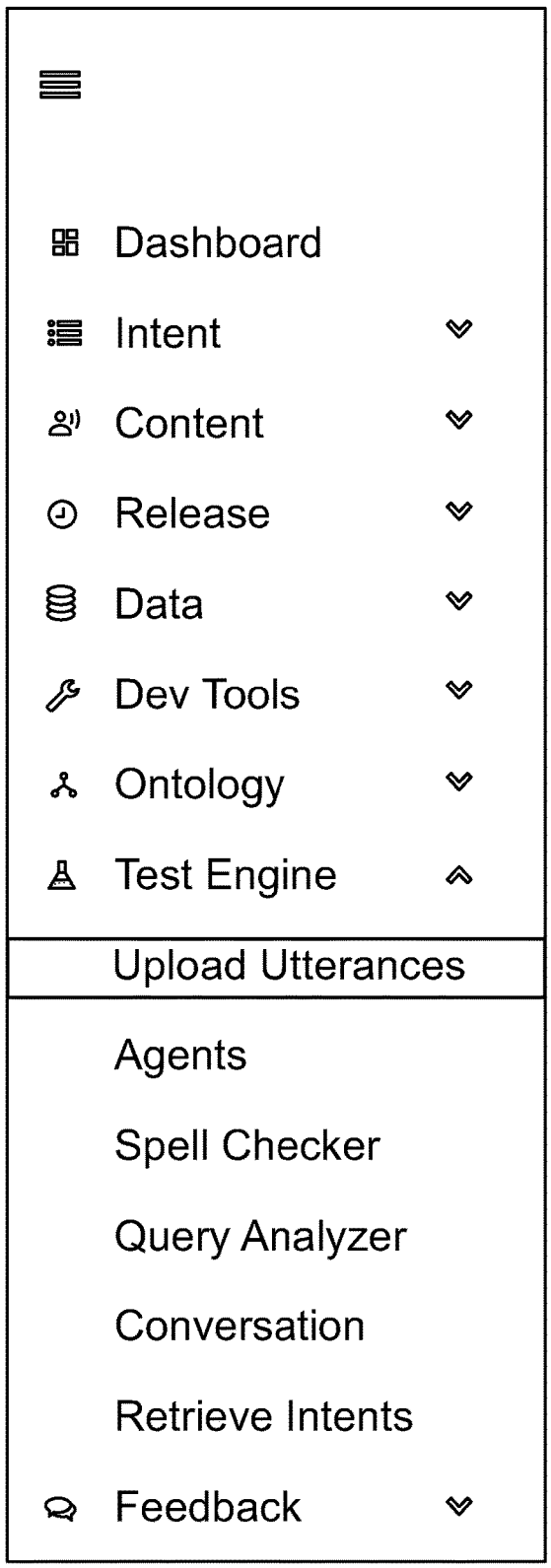

FIG. 4I may show a navigation bar with a button selected. The selected button may be for a "Test Engine" category. The selection may expand the navigation bar to additionally display the following subcategories: "Upload Utterances," "Agents," "Spell Checker," "Query Analyzer," "Conversation," and "Retrieve Intents."

Figure 4J:
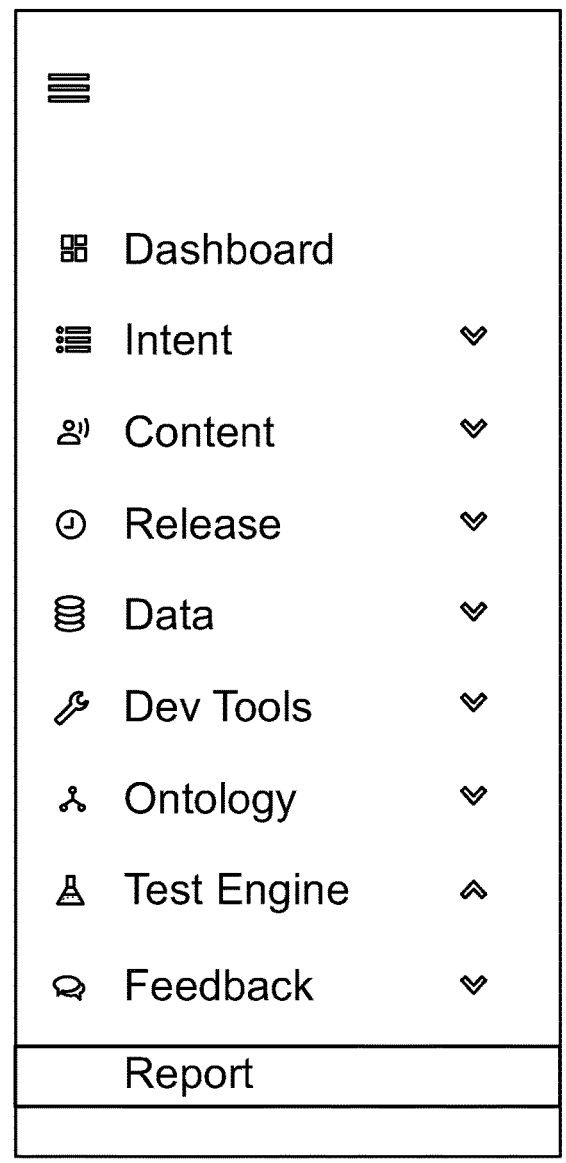

FIG. 4J may show a navigation bar with a button selected. The selected button may be for a "Feedback" category. The selection may expand the navigation bar to additionally display the subcategory "Report."

Figure 5:
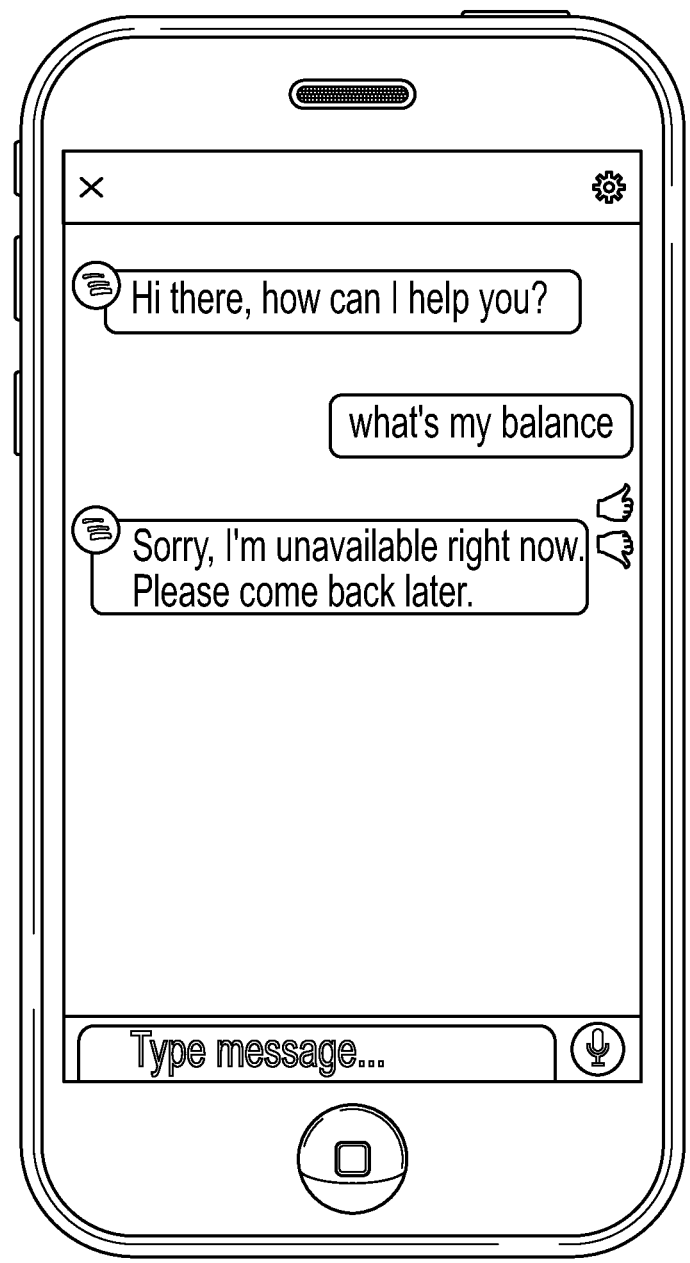
FIG. 5 shows an illustrative display in accordance with principles of the disclosure.

FIG. 5 may show an embodiment of the system that includes a mobile simulator. The mobile simulator may be an actual mobile device. The mobile simulator may also be a virtual or simulated mobile device displayed on a screen of the UI module. The mobile simulator may show the output that the computation module would generate in an interaction with a mobile device. The mobile simulator may show all or part of a conversation.

FIG. 6 may show a chart displayed on a screen via the UI module. The chart may include utterance validation feedback. The chart may include multiple columns. One column may include the names of specific tests that a user may have executed. Other columns may include descriptions and user ratings of the tests. Descriptions may include an assessment of the correctness of the system response to the test. Descriptions may also include a summary of the system response. A user rating column may include an icon, or any other suitable depiction, of a user's rating of the system performance of the test. The icon may be a "thumbs up" or "thumbs down" graphic.

FIG. 7 may show a screen displayed via the UI module. The screen may show a training utterance machine-learning prediction view. The prediction view may show output of the computation module in response to an utterance. The utterance may be the query text "show my spending for the past six months." The screen may show a number of predicted intents along with a value—i.e., a score—associated with each intent. The intent with the highest score may be displayed as the selected intent.

Figure 8:
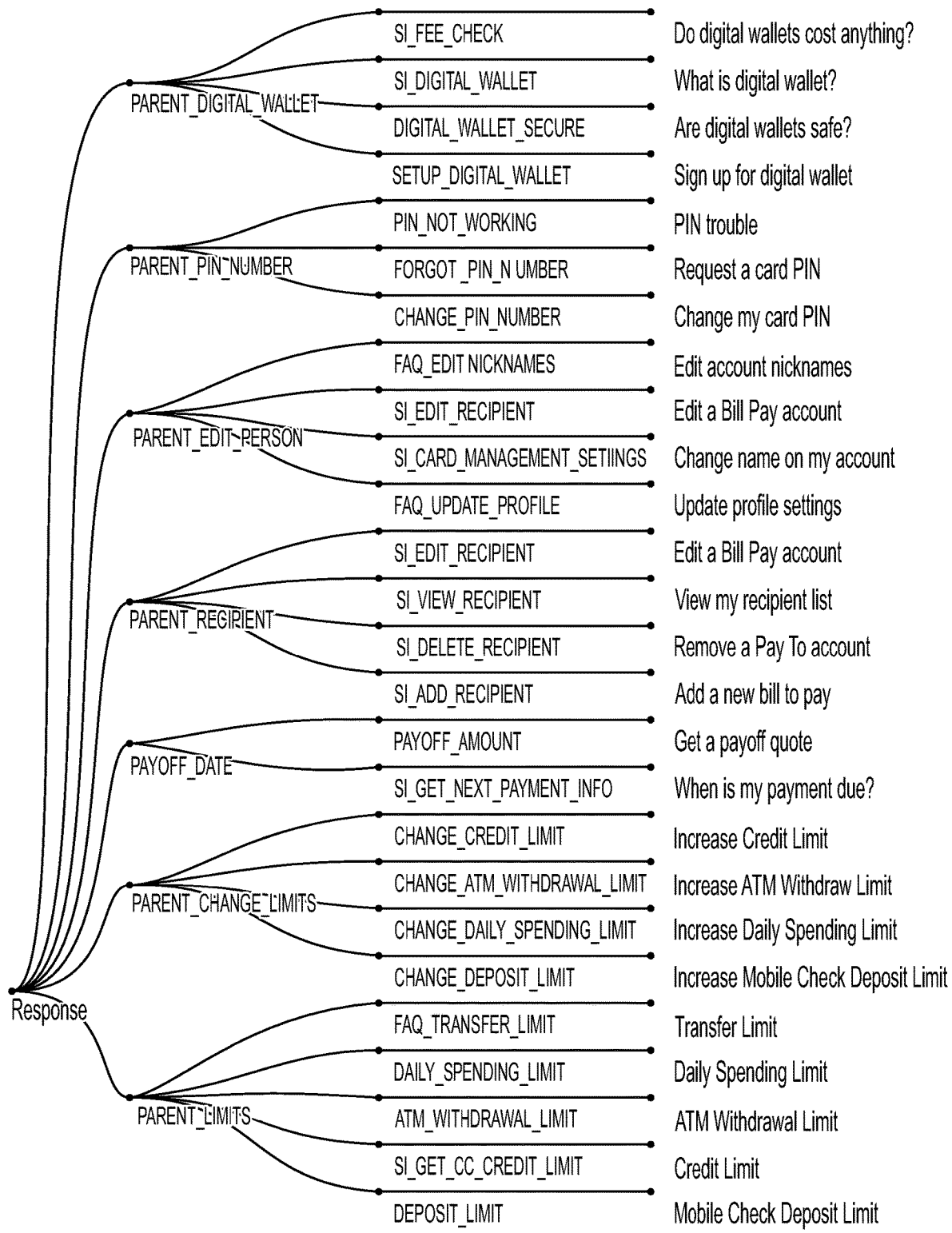
FIG. 8 shows still another illustrative display in accordance with principles of the disclosure.

FIG. 8 may show a graph displayed on a screen via the UI module. The graph may include a visualization of ontological relationships between various utterances and intents. The intents may be grouped into clusters that descend from parent categories.

FIG. 9 may show a screen displayed via the UI module. The screen may show information relating to the supervised learning curation. For example, the screen may show a list of recent training inputs to the system. Each training input in the list may include the name of the user who entered the training input, a timestamp, and a change type (this may be a link to information about the training input). The list may also include information regarding various approvals for the input, such as business and tech approvals. The information may include whether the training input was approved or not. In some embodiments, the screen may provide functionality for an authorized approver to submit an approval.

Figure 10:
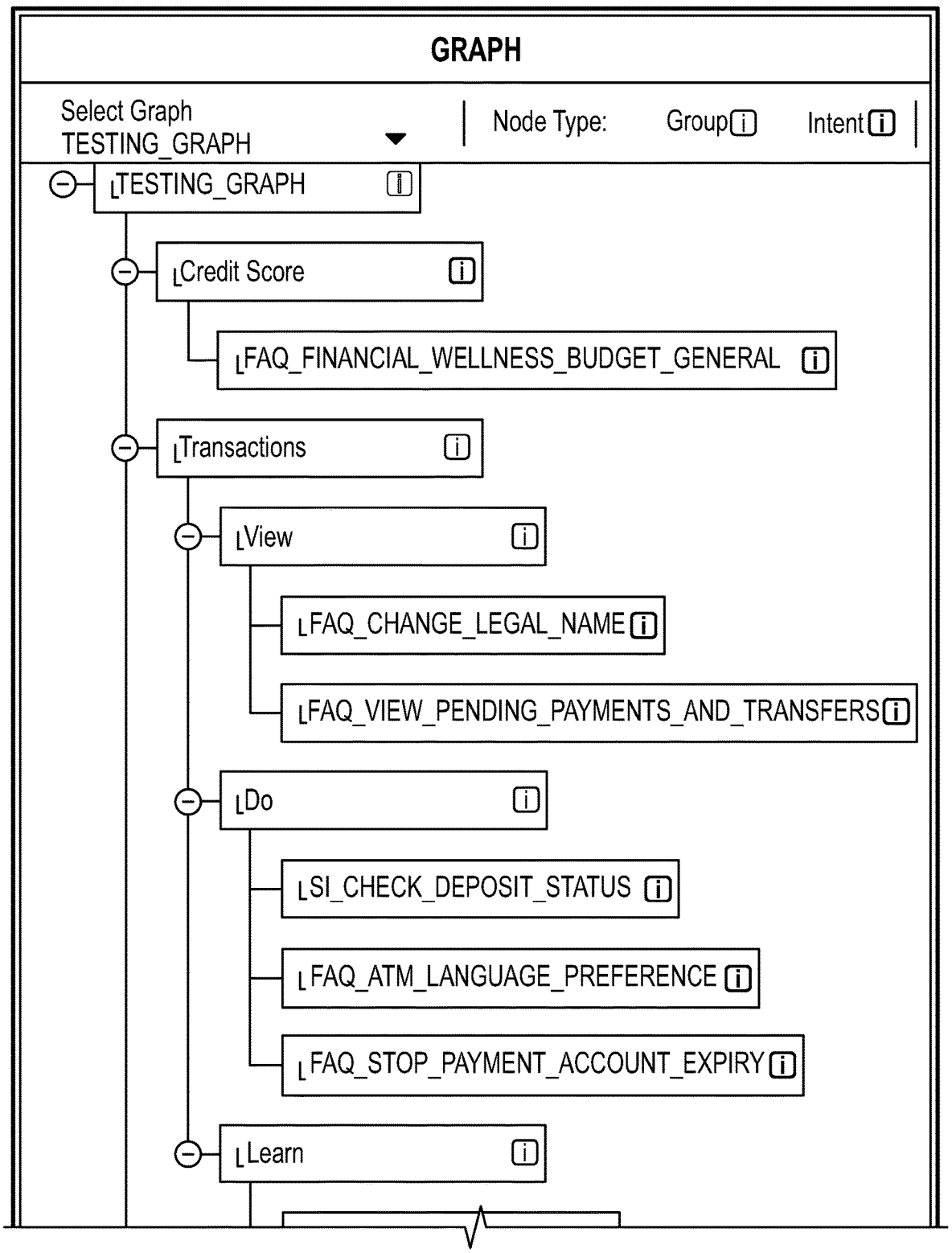
FIG. 10 shows yet another illustrative display in accordance with principles of the disclosure.

FIG. 10 may show a graph displayed on a screen via the UI module. The graph may include semantic relationships. The graph may represent a mapping between various utterances, intents and groups. A user may be able to view, create, and edit the graph via the UI module.

FIG. 11 may show a chart displayed on a screen via the UI module. The chart may include information regarding asset version control and environment migration. The chart may include a list of added utterances. The utterances may have been added with a mapping to an intent. The utterances may have been added to a specific environment and/or published version of the system.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for supervised machine-learning training platforms with isolated update testing and bi-directional update propagation are provided. Persons skilled in the art will appreciate that the present invention can be practiced by other than the described embodiments, which are presented for purposes of illustration rather than of limitation, and that the present invention is limited only by the claims that follow.

What is claimed is:

1. An artificial intelligence system with controlled testing and propagation of updates, said system comprising:
a computation module configured to compute an intent of an utterance, said computation based at least in part on data that is stored in a data repository, said data that includes a set of utterances, a set of intents, and a mapping between the set of utterances and the set of intents;
a user interface ("UI") module, said UI module configured to receive input and display output;
a training subsystem configured to:
receive a training input via the UI module;
determine an effect of the training input on an accuracy of the computation module; and
output the effect via the UI module; and
a versioning module configured to maintain a plurality of environments, each environment configured with a level of isolation from a published version of the computation module, wherein the training subsystem is further configured, when determining the effect of the training input on an accuracy of the computation module, to apply the training input to a select environment from the plurality of environments, the plurality of environments comprising a k number of environments labeled $E_1$-$E_k$, wherein $E_1$ is configured with a maximum level of isolation such that the application of a training input to $E_1$ is independent of incorporation into a published version of the computation module, and $E_k$ is configured with a minimum level of isolation such that the application of a training input to $E_k$ includes full incorporation into a published version of the computation module;

wherein the environments from $E_1$ through $E_k$ are configured with successively decreasing levels of isolation, and wherein forward propagation of the training input from one of the environments to a less isolated environment is contingent upon an approval of an authorized approver.

2. The system of claim 1, wherein $E_1$ is a private drafting environment, and is accessible only to a single authorized user.

3. The system of claim 1, further comprising bi-directional channels between the plurality of environments, said bi-directional channels configured to propagate a training input in a forward direction, said forward direction being from $E_1$ toward $E_k$, and also configured to propagate a training input in a backward direction, said backward direction being from $E_k$ toward $E_1$.

4. The system of claim 1, wherein the training input comprises a second mapping between one or more utterances and one or more intents, said second mapping that either adds to, removes from, or modifies the mapping included in the data.

5. The system of claim 1, wherein the training subsystem is further configured to display, via the UI module:
the data included in the database;
an assessment of a performance of the computation module; and
content of the system, said content including an output generated by the computation module.

6. The system of claim 1, further comprising an update maintenance module, said update maintenance module that is configured to track updates to each of the plurality of environments and to each of a plurality of published versions of the computation module, each update comprising an application of a training input.

7. The system of claim 6, wherein the training update includes removal of a certain mapping between an utterance and an intent, and the update maintenance module is configured to flag the certain mapping as removed.

8. The system of claim 1, wherein the training subsystem triggers an alert in response to a training input that causes:
at least a threshold level of decay in an accuracy of the computation module; or
a collision with the mapping included in the data.

9. The system of claim 1, wherein the UI module includes a testing simulator, said testing simulator being accessible on a mobile device.

10. A method for machine-learning training with controlled testing and propagation of updates, said method comprising:
receiving a training input via a user interface ("UI") module;
applying said training input to a select environment from a plurality of environments, each environment from the plurality of environments configured with a predetermined level of isolation;
determining, within the select environment, an impact of the training input on an accuracy of a computation module, said computation module configured to compute an intent of an utterance, said computation based at least in part on data that is stored in a data repository, said data that includes a set of utterances, a set of intents, and a mapping between the set of utterances and the set of intents; and
displaying the impact via the UI module;
wherein:
the plurality of environments comprise a k number of environments labeled $E_1$-$E_k$, wherein $E_1$ is configured with a maximum level of isolation, $E_k$ is configured with a minimum level of isolation, and the environments between $E_1$ and $E_k$ are configured with successively decreasing levels of isolation;
applying a training input to $E_1$ is independent of incorporation into a published version of the computation module;
applying a training input to $E_k$ includes full incorporation into a published version of the computation module; and
the method further comprises propagating the training input in a forward direction, said forward direction being from $E_1$ toward $E_k$, and also comprises propagating the training input in a backward direction, said backward direction being from $E_k$ toward $E_1$, wherein propagating the training input in a forward direction is contingent upon an approval of an authorized approver.

11. The method of claim 10, wherein $E_1$ is a private drafting environment, and is accessible only to a single authorized user.

12. The method of claim 10, wherein the training input comprises a second mapping between one or more utterances and one or more intents, said second mapping that comprises either adding to, removing from, or modifying the mapping included in the data.

13. The method of claim 10, further comprising displaying, via the UI module:
the data included in the database;
an assessment of a performance of the computation module; and
content of the system, said content including an output of the computation module.

14. The method of claim 10, further comprising tracking, via an update maintenance module, updates to each of the plurality of environments and to each of a plurality of published versions of the computation module, each update comprising an incorporating of a training input.

15. The method of claim 10, further comprising triggering an alert in response to a training input that causes:
at least a threshold level of decay in an accuracy of the computation module; or
a collision with the mapping included in the data.

16. An artificial intelligence system with isolated update testing and bi-directional update propagation, said system comprising:
a computation module configured to compute an intent of an utterance based at least in part on data that is stored in a data repository, said data that includes a set of utterances, a set of intents, and a mapping between the set of utterances and the set of intents;
a user interface ("UI") module, said UI module configured to receive input and display output; and
a training subsystem configured to:
receive a training input via the UI module, said training input comprising a second mapping between one or more utterances and one or more intents, said second mapping that either adds to, removes from, or modifies the mapping included in the data;
apply the training input to a select environment from a plurality of environments, the plurality of environments comprising a k number of environments labeled $E_1$-$E_k$, wherein $E_1$ is configured with a maximum level of isolation such that the application of a training input to $E_1$ is independent of incorporation into a published version of the computation module, and $E_k$ is configured with a minimum level of isolation such that the application of a training input to $E_k$ includes full incorporation into a published version of the computation module, and the environments between $E_1$ and $E_k$ are configured with successively decreasing levels of isolation;

determine an effect of the training input on an accuracy of the computation module; and output the effect via the UI module;

wherein the training subsystem further comprises bi-directional channels between the plurality of environments, said bi-directional channels configured to propagate a training input in a forward direction, said forward direction being from $E_1$ toward $E_k$, and also configured to propagate a training input in a backward direction, said backward direction being from $E_k$ toward $E_1$.

\* \* \* \* \*